United States Patent [19]

Stein

[11] 4,302,433
[45] Nov. 24, 1981

[54] PROCESS FOR PRODUCING ANHYDROUS MAGNESIUM CHLORIDE AND SUITABLE APPARATUS

[75] Inventor: Richard B. Stein, San Donato Milanese, Italy

[73] Assignee: Anic S.p.A., Palermo, Italy

[21] Appl. No.: 792,911

[22] Filed: May 2, 1977

Related U.S. Application Data

[63] Continuation of Ser. No. 519,841, Oct. 31, 1974, abandoned.

[30] Foreign Application Priority Data

Oct. 31, 1973 [IT] Italy .............................. 30784 A/73

[51] Int. Cl.³ .............................................. C01F 5/32
[52] U.S. Cl. ............................................... 423/498
[58] Field of Search ...................................... 423/498

[56] References Cited

U.S. PATENT DOCUMENTS

| 1,457,493 | 6/1923 | Bradner | 260/544 K |
|---|---|---|---|
| 1,702,301 | 2/1929 | Jaeger | 423/498 |
| 2,165,284 | 7/1939 | Madorsky | 423/498 |
| 3,067,006 | 12/1962 | Ebert et al. | 423/178 |
| 3,317,414 | 5/1967 | Fougner | 423/498 |
| 3,369,864 | 2/1968 | Shaw | 423/498 |
| 3,719,743 | 3/1973 | Simon et al. | 423/498 |

FOREIGN PATENT DOCUMENTS

| 1960232 | 6/1971 | Fed. Rep. of Germany | 423/497 |
|---|---|---|---|
| 111313 | 10/1917 | United Kingdom | 423/497 |
| 886212 | 1/1962 | United Kingdom | 423/498 |

Primary Examiner—Earl C. Thomas
Attorney, Agent, or Firm—Morgan, Finnegan, Pine, Foley & Lee

[57] ABSTRACT

Substantially anhydrous magnesium chloride is prepared through the chlorination of a hydrated magnesium chloride by melting the hydrated chloride, feeding that molten material to a bed of carbonaceous material so that it flows downwardly therethrough and simultaneously feeding a mixture of chlorine and air to the bed of carbonaceous material so that it flows upwardly therethrough countercurrent to the molten material, until magnesium chloride of the desired state of purity is obtained, and the purified magnesium chloride is then recovered.

4 Claims, 1 Drawing Figure

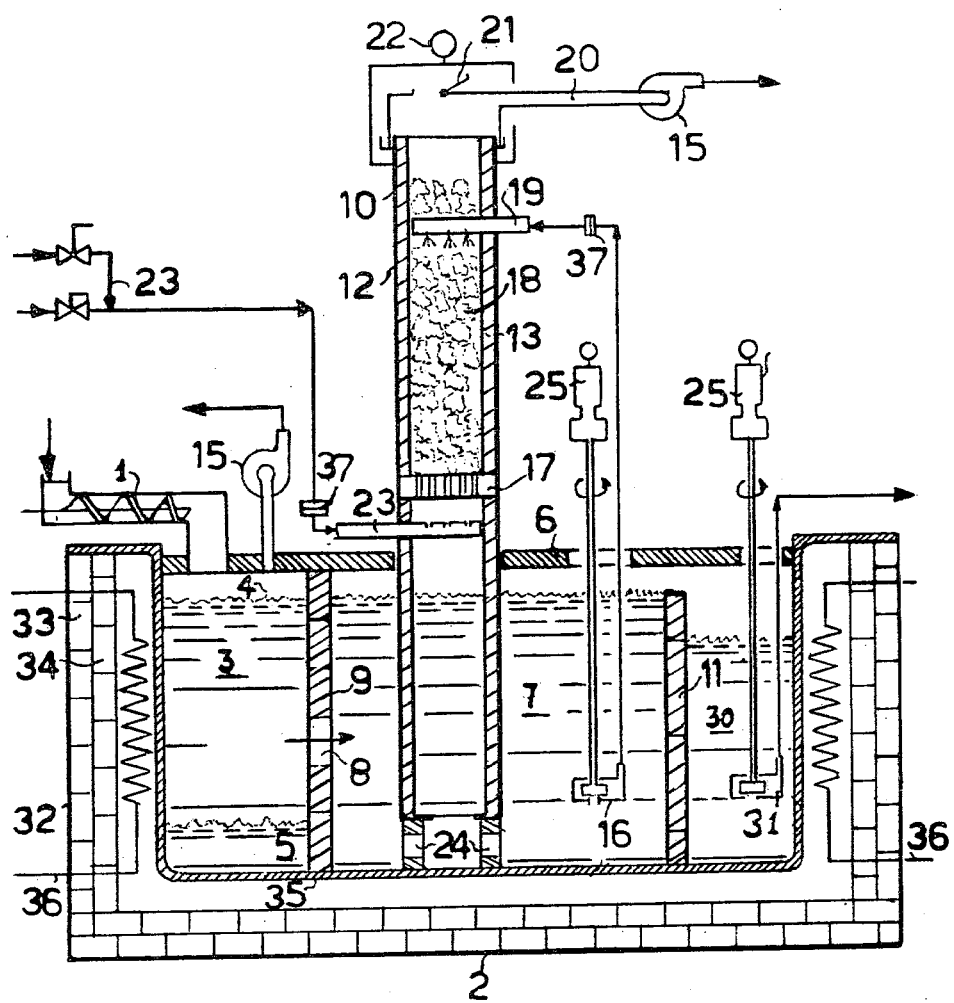

PROCESS FOR PRODUCING ANHYDROUS MAGNESIUM CHLORIDE AND SUITABLE APPARATUS

This is a continuation, of application Ser. No. 519,841 filed Oct. 31, 1974 which is now abandoned.

This invention pertains to the field of preparation of purified inorganic salts, specifically magnesium chloride. More particularly it pertains to the treatment of hydrated magnesium chloride to remove water and reaction products of water and magnesium chloride therefrom. In practice, the magnesium chloride feed material may contain other chlorides, such as the chlorides of sodium, potassium, lithium and calcium.

The present invention provides magnesium chloride essentially free from water and allied impurities by chlorinating a hydrated salt previously obtained by known methods, for example, by spray drying or in another appropriate manner. The spray dried material is melted and contacted in the liquid phase with lumps of carbonaceous material, e.g. coke, air (or oxygen) and chlorine in such a manner as to obtain a dried and purified material. The so obtained material may be utilized for charging directly to the electrolytic cells.

In fact the anhydrous type of electrolytic magnesium cell requires a cell feed essentially free of water, oxychlorides and oxides. If this type of cell is fed with $MgCl_2$ containing water or products resulting from reactions between water and the salt, the cell suffers a drop in current efficiency, an accelerated consumption of graphite anodes and may develop serious operating problems due to evolution of gas and the deposition of hydrogen at the cathodes.

It is, therefore, most advantageous especially from the economic point of view to use in the electrolytic cells a $MgCl_2$ feed material which is completely free from water, oxide and oxychloride.

It is known that aqueous magnesium chloride solutions and magnesium hydrates can be dried by spray drying so as to be converted into products containing at best about 2-5% by weight water and about 2-5% by weight magnesium oxide.

Such material if melted or subjected to further drying causes the $MgCl_2$ to decompose and the resulting material is no longer suitable as feed to the electrolytic cells. It has been found that the water is removed and the oxide and oxychlorides are reconverted to $MgCl_2$ by the appropriate chlorination reaction and that the purified material from such treatment is ideally suited for direct feed to electrolytic cells.

It is known that magnesium chloride melts containing magnesium oxide can be treated with gaseous chlorine as from U.S. Pat. No. 3,067,006. During this treatment, the melt is allowed to trickle down in a tricking tower charged with lump coke which serves as electric resistance for heating while simultaneously being consumed as chlorinator reactant.

The process of the present invention for the manufacture of anhydrous magnesium chloride substantially free from water, magnesium oxide and oxychlorides is based on chlorinating a salt which consists essentially of magnesium chloride containing about 2-5% by weight each of water and magnesium oxide, in the presence of oxygen or gas containing oxygen, the salt being introduced first into a melt chamber containing molten $MgCl_2$ salt and where the introduced salt is melted and separated by gravity from floating and sinking impurities, thence it passes to a chlorinator tower in which the impure salt is pumped through the tower sufficient times to allow contact with lump coke tower packing and countercurrently flowing chlorine plus air (or oxygen) and where the water, magnesium-oxide and oxychlorides are removed by chemical reaction and thence to a settling and collecting chamber from which the purified salt is removed by pumpout.

The chlorinating gas which is used in counter-current is typically a mixture of 50% chlorine and 50% air by weight in which the presence of air or oxygen is found to be essential to the chlorinator reaction.

This gas is ideally obtained from the magnesium electrolytic cell anode gas; after liquification of the chlorine content there results a residual "sniff gas" of the proper composition to be recycled to the chlorinator tower of this invention.

The employ of one or more circulating pumps to recycle magnesium chloride melt through the chlorinator tower is a novel element to obtain proper control of total contact time of the melt with coke and chlorinating gas. Judicious design of the chlorinator tower cross section, the pump liquid rate and the holdup time in the chlorinator chamber results in an independent means to control the final product purity by varying the pump motor speed and hence its flowrate.

BRIEF DESCRIPTION OF THE DRAWING

The drawing is an elevation, in section, of a furnace assembly embodying my invention.

The apparatus used in carrying out the process of this invention, which is a second aspect of my invention consists of a furnace assembly 2 (as shown in the accompanying drawing) containing: a plurality of chambers 3, 7, 30: a chlorinator tower 10; circulating pumps 16, 31; and a system for heating and maintaining the temperature of the molten salt 37. The chlorinator tower 10 is packed with a bed of lump coke 18 over which the pumped molten salt flows downward counter-current to a chlorine and air mixture introduced through gas control manifold valves 23. Interchangeability of chlorinator tower 10 is a novel feature for to improve the continuity of operation it is made easily removable from furnace 2 and easily replaced by a stand-by tower of identical construction. As a variation the furnace 2 can be fitted with a plurality of chlorination towers with one tower continuously on reserve stand-by.

According to the scheme illustrated in the drawing the process is performed as follows:

The salt is continuously introduced via an airtight screw-type feeder 1, fully packed to essentially eliminate entry of water vapor, into a melt chamber 3 which is one of a plurality of chambers contained in the overall assembly 2, referred to hereinafter as the Furnace. In chamber 3 the feed salt powder falls upon the surface of molten salt 4; a certain amount of decomposition of $MgCl_2$ takes place as the salt melts by contact at 740°-800° C. The offgas vapors, mostly $H_2O$ and HCl, are exhausted by fan 15 and sent to a gas treating system. Most of the magnesium oxide either contained in the feed salt or formed upon decomposition will settle by gravity onto the bottom floor of chamber 3 in the form of sludge 5. Sludge 5 is periodically removed by a shovel or other appropriate means through a port (not shown) in the Furnace cover 6. The salt is now melted and is free to flow into the adjoining chamber 7 by means of an aperture 8 in the partition wall 9.

The chlorination chamber 7 contains the chlorinator tower 10 and its circulating pump 16, and is isolated from the other chambers by refractory walls 9 and 11. The chlorinator tower is constructed as follows: inside a steel shell 12 is a refractory lining 13 (of mullite or sillimanite, for example) split into two halves which are separated by a perforated support plate 17. The upper half of 10 is filled with a bed of lumps of coke 18 into which passes laterally a liquid distributor pipe 19. The top of the tower 10 is fitted with a gas-tight hood leading away to a gas collector, a port 21 through which coke can be added and/or serves as observation port, and a lifting ring 22 by means of which the complete tower assembly 10 may be lifted into or out of the chamber 7. The lower half of tower 10 is fitted with a lateral gas distribution pipe 23 to which is connected a gas manifold through which are admitted in controlled rates the reaction gases chlorine and air (or oxygen). The entire tower assembly 10 is contained within a steel shell 12 which maintains the various parts in proper position and alignment and which also serves as external support and enclosure, especially when lifting the tower 10 in and out of the chamber 7. Tower 10 sits on an open platform of refractory bricks 24 which raise it off the floor of compartment 7 and allow clean liquid to flow out from beneath and back into chamber 7.

Circulation of liquid molten salt is assured by pump 16 which is typically an open-impeller type submerged centrifugal pump. Pump 16 is typically driven by a variable speed air motor 25 so that flow rate of circulating liquid can be conveniently controlled in such a manner as to obtain optimum performance of the chlorination reaction. The packed bed of coke lumps 18 through which is flowing downwards a cascade of liquid $MgCl_2$ containing impurities, while simultaneously is flowing counter-currently upwards a current of chlorine and air constitutes a packed tower reactor for chlorinating the contained impurities to yield purified $MgCl_2$.

Purified salt flows from chamber 7 by an overflow wier in partition wall 11 into the collecting chamber 30. A centrifugal pump 31 similar or identical to pump 16 is used to pump the purified product directly to the employments.

Pumpout can be either in continuous or on a batch basis.

The whole furnace assembly 2 consists of an outside steel shell 32, an appropriate refractory lining of thermal insulating bricks 33 and salt resistant refractory bricks 34, an internal steel crucible 35, the refractory cover 6 and suitable means for heating. The FIGURE shows heating by means of external electric resistance elements 36, but heating is also practicable by gas or oil burners operating in the space between crucible 35 and refractory wall 34. Another heating method is to eliminate the steel crucible 35 and allow refractory walls 34 to contain the molten salt while heat is furnished by means of passage of alternating current through the salt from suitable electrodes submerged in the molten salt and connected to a low-voltage transformer.

The quality of molten salt within the apparatus of this invention may be determined by measuring the direct current milliamperage passed through the material at a fixed voltage of about 1.0 volt. The test is performed by using a set of concentric electrodes made of vitreous carbon set into a holder of sintered alumina and plunged into the molten bath at the point where it is desired to measure the purity. Calibration of the test procedure on pure and hydrated molten $MgCl_2$ of known water content showed that the direct current passed is linearly correlated with water content through the range 20 ppm up to 2-3% by weight.

The following examples serve to illustrate the invention, but they are not intended to limit thereto:

EXAMPLE 1

In batch operation a miniature chlorination tower was constructed from a sintered alumina tube having a porous fritted plate to support the coke bed. The tube was filled with 10 grams of crushed metallurgical coke, 50 grams of $MgCl_2$ containing 2% humidity by weight and fitted with electrodes for continuous measurement of the water content. The tube assembly was placed in an electric furnace heated and maintained at 780° C. while a current of gas measuring 50% $Cl_2$–50% air by volume was passed upward through the bed at a rate of 0.2 cubic centimeters per second. From an original concentration of 2% humidity the water content fell to 0.5% in 2 hours and to 0.15% in 4 hours.

EXAMPLE 2

In continuous operation 6 kg./h. salt containing 72% $MgCl_2$, 26% $H_2O$ and 2% MgO was introduced into melt chamber 3 of a furnace crucible 36 holding approximately 200 kg of molten salt containing 82% $MgCl_2$, 12% KCl and 6% NaCl and maintained at 740° C. Chlorinator tower 10 was filled with 4 kg. of coke of 35 mm. lump size and gas was admitted through inlet pipe 23 at the rate of 3 kg./h. of $Cl_2$ plus 2 kg./h. of air. Molten salt in chamber 7 was circulated with pump 16 at a steady rate of 5 liters/min. equal to about 400 kg./h. At steady-state conditions the water and oxychlorides in the inlet chamber 3 measured 2.1% by weight and in the outlet chamber 30 these impurities measured 0.17%.

What we claim is:

1. The process of preparing a substantially anhydrous magnesium chloride from a hydrated magnesium chloride feed material, said process comprising:
   (a) drying said feed material;
   (b) feeding said dried material to a melting chamber in a heated furnace to form a liquid containing molten $MgCl_2$;
   (c) thereafter causing the liquid containing molten $MgCl_2$ to flow through a passage in a wall separating said melting chamber from a chlorination chamber, to said chlorination chamber;
   (d) continuously feeding molten $MgCl_2$ from said chlorination chamber, to a chlorination tower in said furnace containing lumps of carbonaceous material, so that it flows downwardly through said bed;
   (e) introducing a gaseous stream of substantially equal parts of chlorine and air into the lower part of said chlorination tower so that it flows upwardly through said bed of carbonaceous material counter-currently to said molten $MgCl_2$; and
   (f) withdrawing from the furnace substantially anhydrous $MgCl_2$.

2. The process of claim 1 wherein the carbonaceous material is coke.

3. The process of claim 1 wherein the feed material is spray dried to include from 2-5% by weight water and 2-5% by weight magnesium oxide.

4. The process of claim 3 wherein the quality of the molten $MgCl_2$ is measured prior to to withdrawing the substantially anhydrous $MgCl_2$ from said furnace.

* * * * *